United States Patent [19]
Forster, Jr.

[11] 3,744,882
[45] July 10, 1973

[54] COMPOSITE LENS FOR AN OPTICAL COMMUNICATION SYSTEM PROVIDING DIRECTLY VIEWED REAL IMAGES

[75] Inventor: Harry D. Forster, Jr., Miami, Fla.

[73] Assignee: Holograph Corporation, Watertown, Mass.

[22] Filed: Aug. 20, 1971

[21] Appl. No.: 173,369

Related U.S. Application Data

[63] Continuation-in-part of Ser. No. 884,786, Dec. 15, 1969, abandoned.

[52] U.S. Cl.................... 350/241, 350/211, 353/98
[51] Int. Cl........................ G02b 3/08, G02b 27/02
[58] Field of Search............... 350/211, 31, 235–241

[56] References Cited
UNITED STATES PATENTS

| | | | |
|---|---|---|---|
| 3,537,771 | 11/1970 | Trufanoff | 350/211 X |
| 1,390,258 | 9/1921 | Geneste | 350/211 X |
| 1,549,579 | 8/1925 | Lenouvel | 350/31 X |
| 3,525,807 | 8/1970 | Herriott et al. | 350/211 UX |
| 3,203,306 | 8/1965 | Lefferts | 350/211 |
| 2,282,167 | 5/1942 | Cullman | 350/211 X |
| 1,986,966 | 1/1935 | Godwin | 350/238 |

FOREIGN PATENTS OR APPLICATIONS 1,010,615  11/1965  Great Britain ..................... 350/238

Primary Examiner—John K. Corbin
Attorney—Ostrolenk, Faber, Gerb & Soffen

[57] ABSTRACT

A Fresnel type lens having a discontinuously sloping stepped surface surrounds a smaller lens of comparable focal length axially aligned therewith but having a continuously sloping surface to reduce image distortion in the vicinity of the center of the Fresnel lens. The lens provides a unique viewing capability in both single lens and composite lens structures.

16 Claims, 11 Drawing Figures

INVENTOR.
HARRY D. FORSTER, JR.
BY
Ostrolenk, Faber, Gerb & Soffen
ATTORNEYS

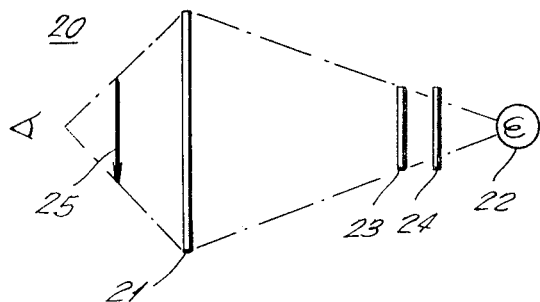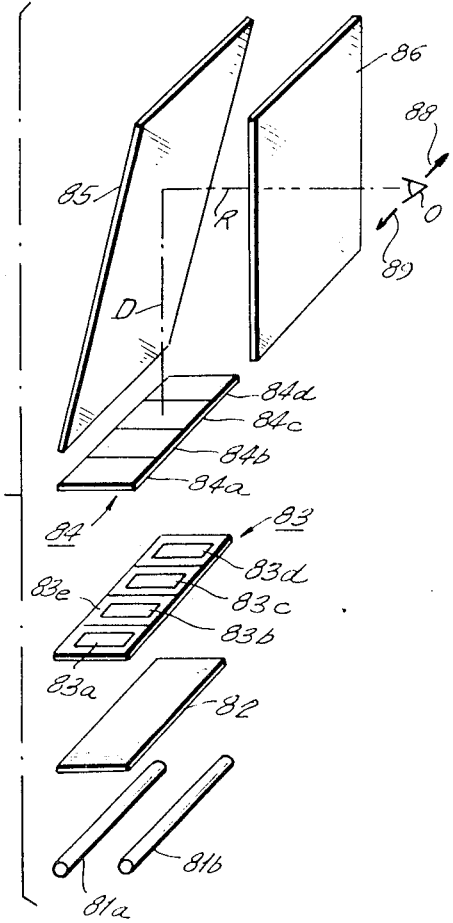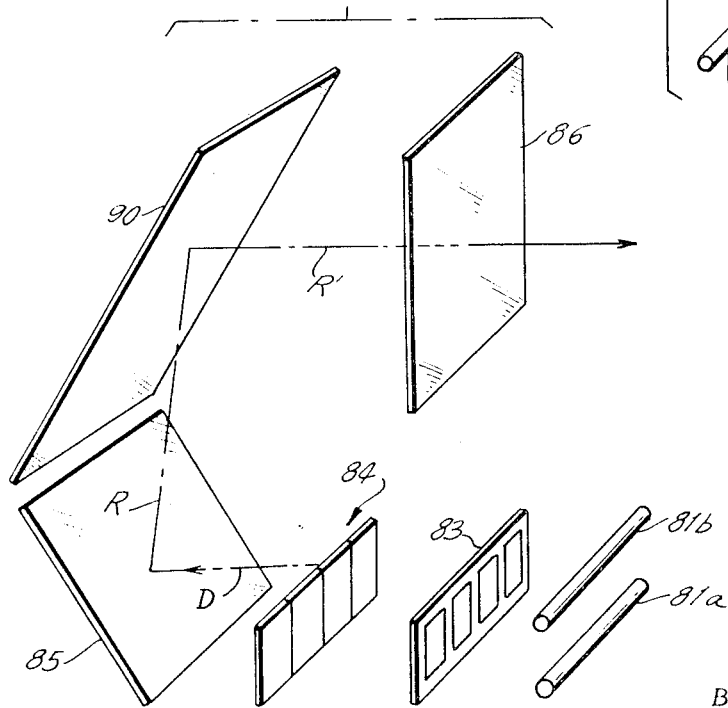

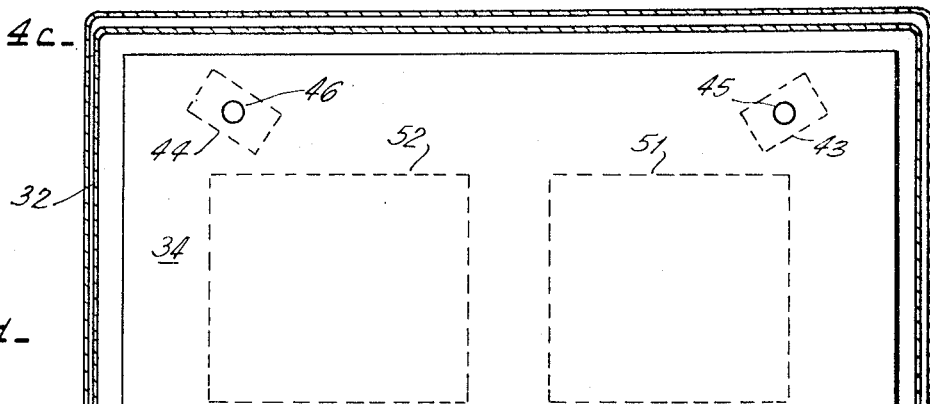
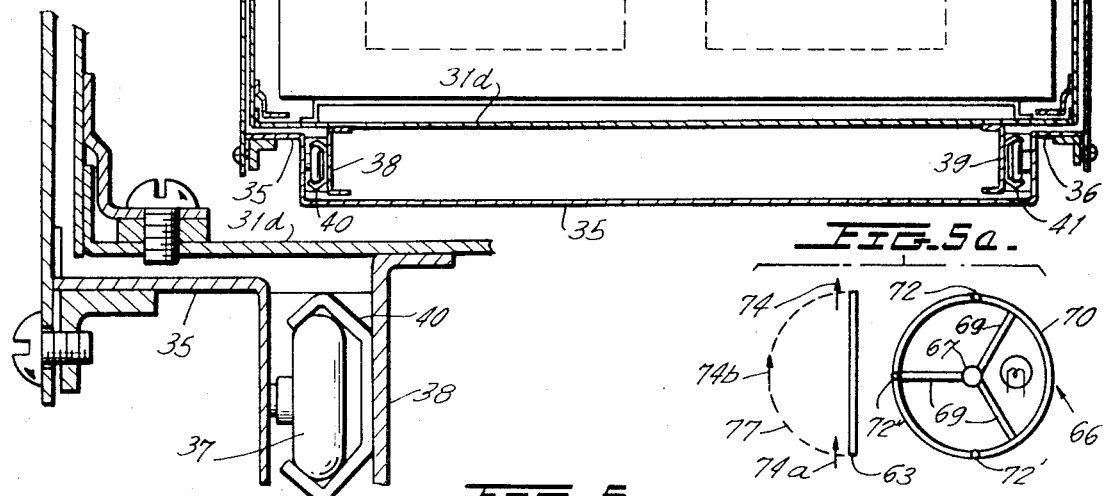
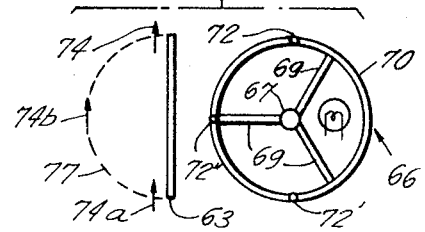
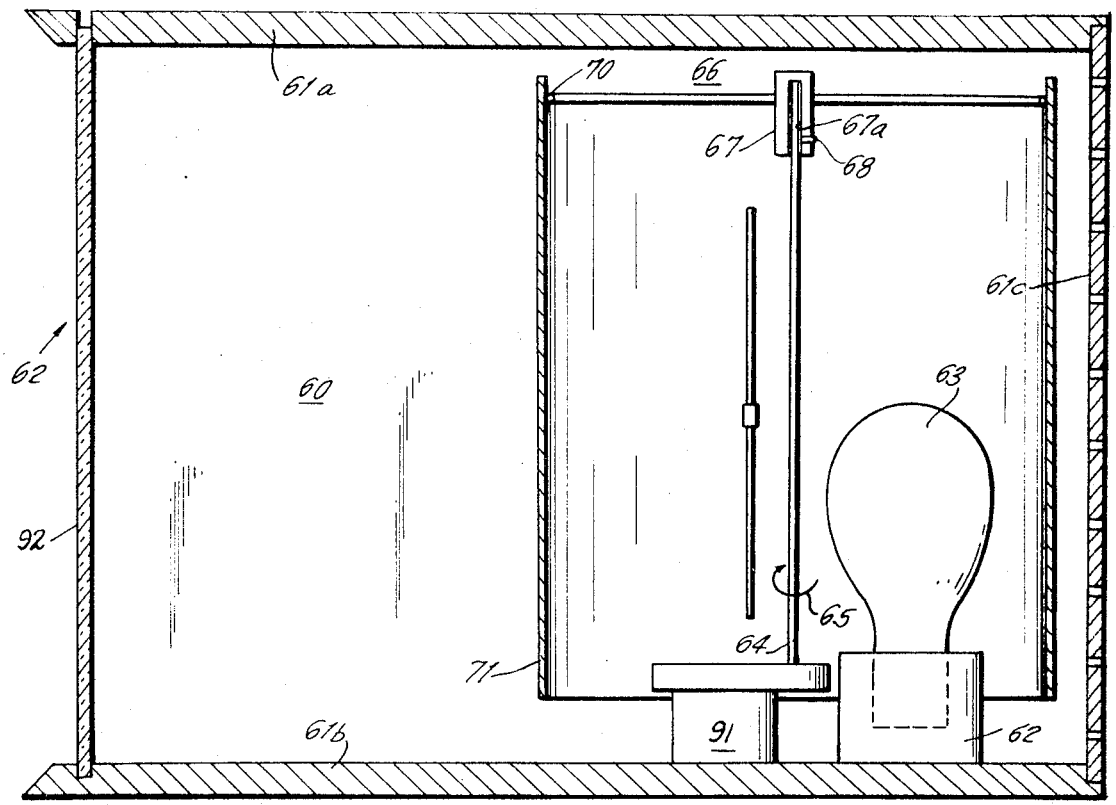

COMPOSITE LENS FOR AN OPTICAL COMMUNICATION SYSTEM PROVIDING DIRECTLY VIEWED REAL IMAGES

This application is a continuation-in-part application of Ser. No. 884,786 filed Dec. 15, 1969 now abandoned.

This invention relates to a composite lens arrangement for use in an optical communication system providing directly viewed real images. Such a system is described in my pending application, Ser. No. 850,021, filed Aug. 14, 1969 and abandoned in favor of continuation-in-part application Ser. No. 173,368 filed Aug. 20, 1971, entitled "Optical Communications System Providing Selective Image Presentations," and assigned to the same assignee as this instant application.

BACKGROUND OF THE INVENTION

One feature of the optical communication system of my aforesaid application is that the spectrum over which an image can be seen is controllable. That is, by adjusting the viewing cone, information can be selectively presented to only a desired set of viewers, excluding all others. Information can, in this manner, be projected only to right lane drivers on a super highway. Further, by projecting different messages in each of several viewing cones, multiple messages can be projected from a single source. As is there described, such an optical communication system also proves attractive as a new dimension in advertising displays.

Some of the advantages of that optical communication system are as follows:

a. the system has the ability to selectively present information to viewers according to their needs and position, enabling presentation of unique information to different traffic lanes or to separate audience locations;

b. the information can effectively be suspended in space as an aerial image without the need for a physical obstruction, such as a screen;

c. the system permits control of projection distances and viewing angles so that images appear to move with the observer, to increase visual effectiveness; and d. the system lends itself to reduced vandalism because images are not formed on a physical mass which can be damaged or destroyed.

One arrangement for the optical source of my Ser. No. 850,021 system includes a Fresnel lens. Such lenses typically comprise built-up annular rings ground in steps or concentric circular areas. The centers of curvature of the different rings progressively recede from the central axis to reduce spherical aberration. In the design of such lenses, the variables of interest include the radius to the center of each step, the index of refraction with respect to air of the material used for the lens, the focal distance from the back of the lens to the plane of the image for an object at infinity, the thickness of the lens and the width of each step. The advantage of using such lenses is that large aperture systems may be constructed at low cost. Construction of these Fresnel-type lenses can be had in a modestly equipped machine shop from a variety of materials, including plastics.

In developing the directly viewed real images of the optical communication system of my Ser. No. 850,021 application, it was found that a distortion was introduced in the area of the center of the Fresnel lens. The distortion, furthermore, appeared to be fairly independent of lens size; thus, use of the Fresnel lens structure did not appear to introduce too objectionable a distortion when a lens size acceptable for highway signing was needed (e.g., 200–500 square feet), but did prove objectionable in advertising displays (of some 5–10 square feet area, for example) where the distortion occupied a not insignificant portion of the overall surface display (approximately 4 square inches).

OBJECTS OF THE INVENTION

It is an object of the present invention, therefore, to provide an improved lens construction for a directly viewed real imaging system where image distortion is kept low.

It is another object of the invention to provide such an improved construction which maintains reasonable image sizes and viewing angles and holds down the bulkiness of the lens employed.

As will become clear hereinafter, the improved construction of the present invention comprises a composite lens having first and second concentric sections. The outer section includes a Fresnel-type lens with a discontinuously sloping stepped surface configuration while the inner section includes a lens of continuously sloping configuration. Both configurations are of comparable focal length and thickness, with the Fresnel arrangement surrounding the continuously sloping arrangement. In one particularly attractive embodiment of the invention, the continuously sloping lens was of a spherical plano-convex construction.

These and other objects of the invention will be more clearly understood from the following description taken in connection with the accompanying drawings, in which:

BRIEF DESCRIPTION OF THE FIGURES

FIG. 3 is a schematic diagram showing one preferred apparatus employing the Fresnel lens of the type shown in FIGS. 1 and 2;

FIGS. 4a–4c are elevational, top and front views of another preferred embodiment of the present invention with portions of the housing of the embodiment being removed in FIGS. 4a and 4b to reveal the contents thereof;

FIG. 4d is an enlarged view showing a portion of the slidable coupling arrangement of FIG. 4c;

FIG. 5 shows a sectionalized elevational view of still another preferred embodiment of the present invention;

FIG. 5a shows a simplified top plan view of the embodiment of FIG. 5; and

FIGS. 6 and 7 are perspective views showing still other preferred embodiments of the present invention.

DETAILED DESCRIPTION OF THE FIGURES

The improved lens of the drawings is especially useful in optical communication systems providing directly viewed real images. The lens 10 is illustrated as being rectangular in nature, although this particular configuration is not critical. One embodiment of the system of my Ser. No. 850,021 application employed such a rectangular lens since the housing for the system was of corresponding shape. The coaxial lens 10 was there approximately three feet in length and two and one-half feet in width to provide a total viewing area of some seven and one-half square feet.

Figure 1:
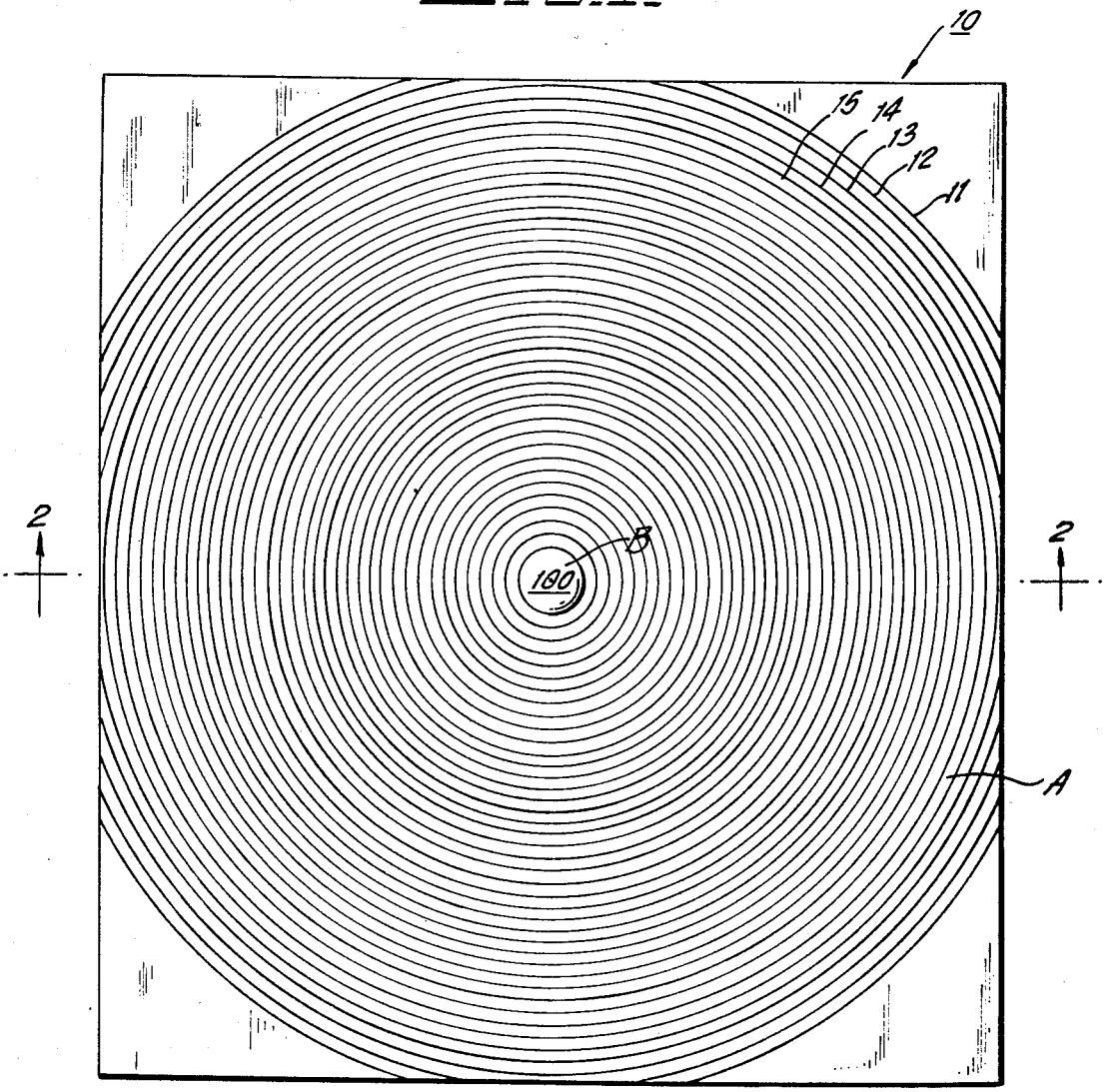
FIG. 1 shows a top view of an improved lens constructed in accordance with one embodiment of the present invention.
Figure 2:
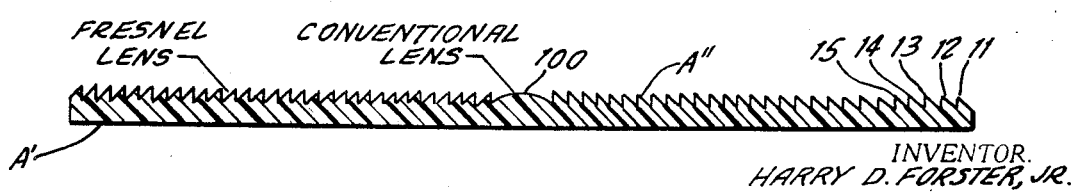
FIG. 2 shows a cross-sectional view of the lens of FIG. 1.

The improved lens 10 of FIGS. 1 and 2 includes a Fresnel lens section A. The discontinuously sloping stepped rings of such a section are illustrated by the reference numerals 11, 12, 13, etc., and may be machined to an appropriate width extending down to a few thousandths of an inch wide. This machining may be done in a modestly equipped machine shop from a plastic material such as Lucite, applying a commercial penetrating oil as the cutting fluid ahead of the cutting tool. As employed in the optical communication system of my aforesaid application, the smooth side A' of the Fresnel section is oriented toward the information source while the stepped face A'' is oriented toward the viewer.

I have observed that the image viewed through this Fresnel lens, by one moving generally parallel to it is noticeably distorted particularly in the vicinity of the center of the lens, i.e., at the optical axis of the composite lens construction. I have further observed that this distortion covered an area of some 4 square inches and caused "smearing" of the resultant image at that axis. While distortion of this nature might be tolerable in large aperture constructions where the distortion covers only a small portion of the overall display, the distortion in aperture arrangements of the order of tens of square feet, and less, would be quite disconcerting. Such large constructions are typical in directly viewed highway signing systems where areas 500 square feet and more are normally encountered to make information presentations visible at distances of hundreds of feet. Such smaller constructions may be found in department store advertising counter displays, for instance, where visibility of much less distance ranges are desired. While images, in general, can be predistorted to compensate such introduced distortion, such predistortion is not very effective in display environments where the information presented to the observer depends on his location and position relative to the display and where the degree of distortion introduced depends on his viewing angle. In such environments, the distortion observed along the optical axis of a Fresnel lens could limit the usefulness of the directly viewed real image system and be a factor mitigating against its use.

However — and in accordance with the present invention — the improved lens 10 of the drawings includes a lens section B having a continuously sloping surface in the vicinity of the optical axis of the Fresnel section A, instead of having the discontinuously sloping Fresnel construction uniform throughout the lens. Such a lens section B may be of a plano-convex or plano-concave configuration, and may be spherical or aspheric in nature. This second lens section B is selected of a focal length and thickness comparable to that of the Fresnel configuration, and might be formed through a separate machine step during the fabrication of the resulting composite lens. Alternatively, the lens of the invention might be formed as an entire Fresnel arrangement, with its central portion being later removed and a spherical plano-convex lens 100, for example, of comparable focal length and thickness being fitted in its place. It will be appreciated that the securing of the central lens to the Fresnel construction in this latter arrangement would be such as to insure substantially equal indices of refraction in all parts employed.

In the embodiment of the invention employing the rectangular Fresnel sheet of some seven and one-half square foot area, it was found that the insertion of a spherical plano-convex lens of three or four square inch area or so substantially reduced the distortion to the directly viewed real image. Substitution of such a lens for the central portion of a much larger Fresnel construction would similarly reduce distortion of an image at the optical axis as well, though the observance of this reduced distortion would be less pronounced. Thus, in the described environments, lens systems may be employed using Fresnel configurations to keep bulk and cost down while using plano-convex or plano-concave configurations in composite arrangements to minimize image distortion.

As will be appreciated, different features attach to the selection of the particular type of continuously sloping lens section B; a spherical lens construction is easier to manufacture while an aspheric construction provides better imaging qualities for defined conjugate points. Similarly, the plano-concave lens affords a negative focal length construction permitting an increase in the field of depth without the need for additional space requirements, so as to be useful in tunnel settings and wall mounting environments. The plano-convex lens, on the other hand, proves quite useful in the highway signing and advertising display applications where the positive focal length exhibited is made use of in projecting an image towards a viewer. Regardless of the type of continuously sloping lens selected, however, the reduction in image distortion should be readily observable.

FIG. 3 shows one preferred embodiment 20 of the present invention which comprises a Fresnel lens 21 having substantially the structure as shown in FIGS. 1 and 2. A light source 22 is positioned to the right of Fresnel lens 21. A transparency 23 is positioned between the Fresnel lens and the light source and a diffuser panel 24 is positioned between the transparency 23 and the light source. The diffuser panel 24 is preferably a translucent member such as, for example a smoked glass or white plastic panel. In the embodiment 20 of FIG. 3 the viewer is positioned to the left of Fresnel lens 21. The image viewed by the observer is designated by the arrow 25 and can be seen to be positioned in front of (i.e., to the left of) the aperture lens 21. Appropriate positioning of the Fresnel aperture lens 21 relative to the transparency or other image 23 may be made adjustable so as to create the image viewed by the observer to appear behind (i.e., to the right of) aperture lens 21. The use of a Fresnel lens in this manner is enhanced when the object distance (i.e., the distance from the lens 21 to the object of transparency 23) is increased so as to be in a range from 1-½ – 3 times that of the object distance used for Fresnel lenses when operating in its intended manner. Alternatively, the Fresnel lens may be so designed as to utilize the conventional object distance for conventional Fresnel lenses but to change the contour of the Fresnel lens employed so as to obtain the same optical effect as if the object distance between a conventional Fresnel lens and the object is 1-½ – 3 times that normally employed in conventional Fresnel lenses.

Figure 4A:
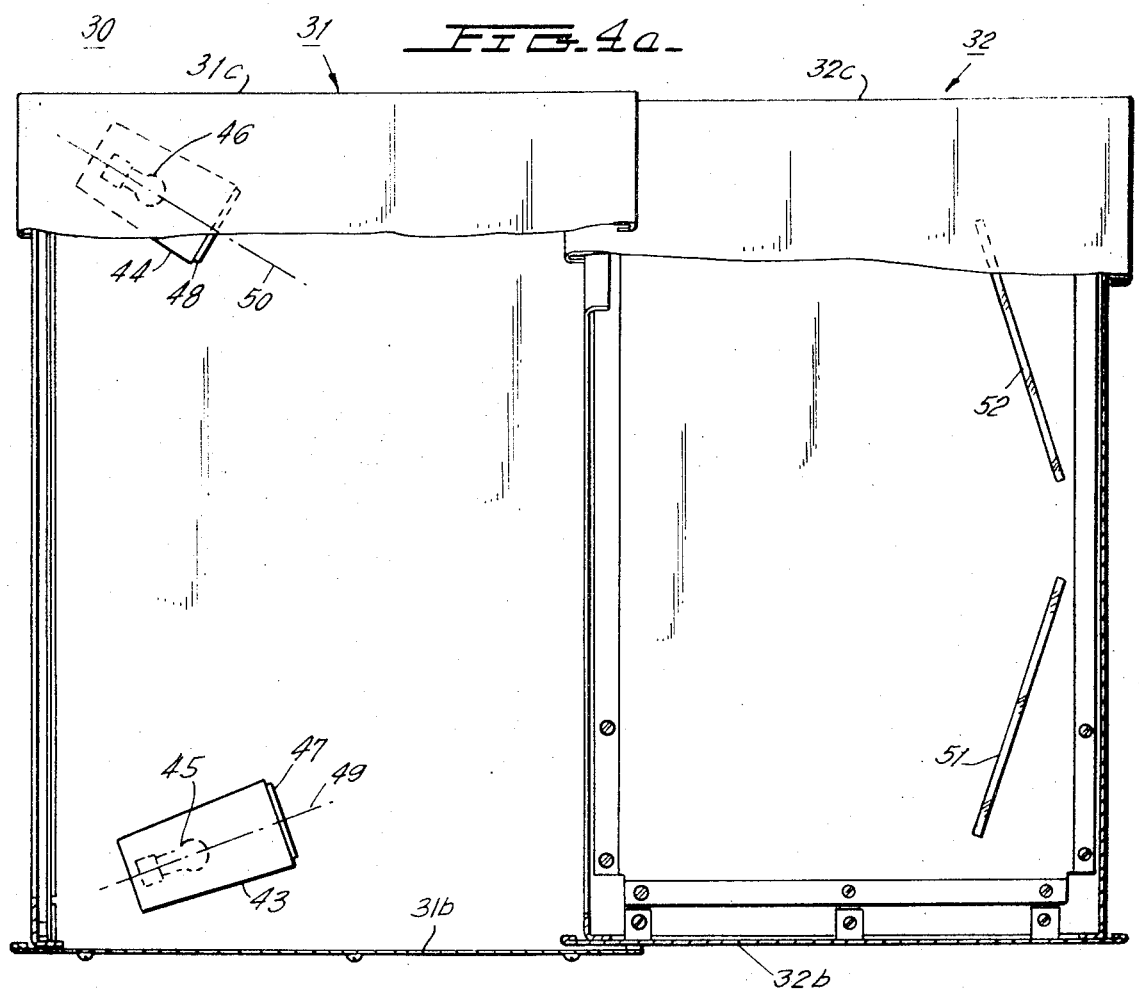
Figure 4B:
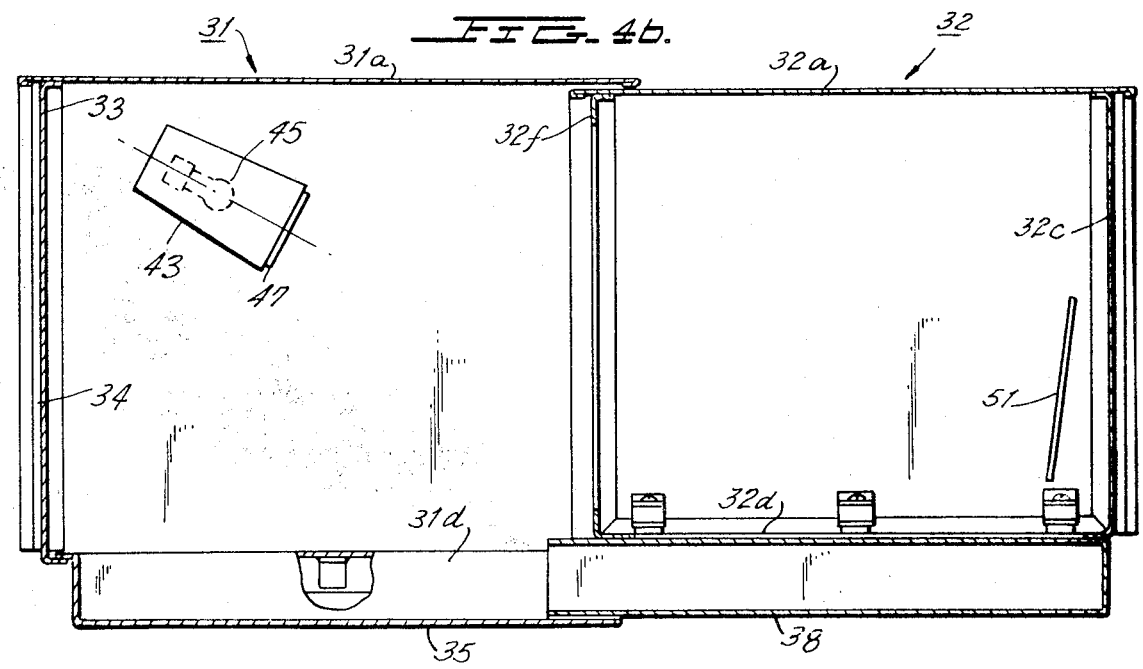

FIGS. 4a–4c show a top view, end view and front view, respectively, of another preferred embodiment of the present invention employing the basic concept of the embodiment of FIG. 3 wherein portions of the housing are shown as being removed so as to reveal the internal structure thereof. The embodiment 30 is comprised of first and second housing portions 31 and 32 which telescope into one another. Housing portion 31 is comprised of a top wall 31a, two side walls 31b and 31c. The left-hand end of housing portion 30 is fitted with a rectangular shaped mask 33 which serves as the frame for a Fresnel lens 34. The right-hand end of housing portion 31 (relative to FIGS. 4a and 4b) is open and is adapted to telescopingly receive the left-hand end of housing portion 32 which is comprised of a top wall 32a, first and second side walls 32b and 32c, and a bottom wall 32d. A rear wall 32e seals off the rear end of housing portion 32 while a rectangular shaped frame portion 32f is employed to increase the structural strength of housing portion 32. Housing portion 31 is provided with brackets 35 and 36 secured along its bottom wall 31d. Each of the brackets is provided with free-wheeling rollers (only one of which is shown in FIG. 4d) arranged at spaced intervals along each of the brackets 35 and 36. The underside of housing portion 32 is fitted with a pair of brackets 38 and 39. A channel shaped member 40 and 41 (note especially FIG. 4c) is secured to each of the brackets 38 and 39, respectively, so as to embrace the free-wheeling rollers in the manner shown. The cooperating free-wheeling rollers 37 and channel shaped members 40 and 41 function to permit the housing portion 32 to be inserted more deeply into housing portion 31 or, alternatively, to be withdrawn from housing portion 31 so as to control the distance between the transparency or image and the Fresnel lens, in a manner to be more fully described.

Housing portion 31 is provided with a pair of enclosure assemblies 43 and 44, each of which are secured to housing portion 31 in any suitable fashion. The housings are employed to support light sources 45 and 46, respectively, as can best be seen in FIGS. 4a and 4b. The right-hand end of each of the housings 43 and 44 is fitted with a transparency 47 and 48 through which the light rays pass. As can best be seen from a consideration of FIGS. 4a and 4b, the longitudinal axes of the housings represented by the dotted lines 49 and 50 are diagonally aligned relative to a horizontal plane (i.e., the plane of FIG. 4a), as well as being diagonally aligned relative to a vertical plane (the plane of FIG. 4b).

Housing portion 32 is fitted with a pair of reflective surfaces which may, for example, be the mirrors 51 and 52 which are likewise aligned diagonally relative to a horizontal plane (the plane of FIG. 4a) as well as being diagonally aligned relative to the vertical plane (the plane of FIG. 4b). The rays emanating from transparency 48 strike mirror 51, while the rays emanating from transparency 49 strike mirror 52. The reflected rays are directed toward the left (relative to FIGS. 4a and 4b) so as to pass through Fresnel lens 34. By adjustment of the rear housing portion 32 relative to the front housing portion 31, the distance between the transparencies and the Fresnel lens 34 may be adjustably controlled. In the embodiment of FIGS. 4a–4d, the adjustable feature permits the images formed to be positioned in space within a range aligned at a point 8 feet to the left of Fresnel lens 34 to a second point which is located 2 feet to the left of Fresnel lens 34. The positioning of the observer determines that image which will be viewed in the same manner as is described in copending application Ser. No. 850,021 referred to hereinabove. Thus, the location of the observer relative to the viewing apparatus is determinative of that image which will be viewed. In the embodiment shown in FIGS. 4a–4d, the viewing cones developed by the separate transparencies are non-overlapping so that the observer when moving from one moving cone into the other experiences no overlapping of images but alternatively sees a rather abrupt change in the image viewed.

FIG. 5 shows still another preferred embodiment 60 of the present invention which is comprised of a housing having a top and bottom walls 61a and 61b, a right-hand or rear wall 61c and a front opening 62 into which a Fresnel lens 63 is fitted. The left and right-hand side walls have been omitted from FIG. 5 for purposes of simplicity.

The bottom wall 61b of the housing supports a socket 62 for receiving light source 63 which may, for example, be an incandescent bulb. Alternatively, a fluorescent tube or any other suitable light source may be provided. A motor 91 is mounted upon bottom wall 61d and is provided with an elongated output shaft 64 which rotate in the manner indicated by arrow 65. A structure 66 which substantially resembles that of a conventional lampshade is mounted to rotate upon shaft 64. The top view of this structure 66 is shown best in FIG. 5a and comprises a collar member 67 having an elongated opening 67a for receiving the top end of shaft 64. A set screw 68 may be provided to secure shaft 64 within opening 67a. Collar 67 is provided with a plurality of outwardly directed radially aligned supporting spokes 69 which are secured at their outer free ends to a circular shaped frame 70. A hollow cylindrical shell 71 is secured to ring 70 and is provided with images, transparencies or other data or information around its circumference. For purposes of understanding the uniqe effect obtained through this apparatus, let it be assumed that an arrow is formed upon the cylindrical shell 71 at the point 72. With motor 91 energized the arrow will move from the point 72 as shown in FIG. 5a to point 72' which constitutes movement through one-half of a full revolution. In conventional structures, this would cause the image to move across the screen from the position occupied by image 74 to the position occupied by image 74a. This would be viewed, for example, through a back-lighted screen where the movement of the cylindrical shell member 71 would clearly be viewable through such a back-lighted screen which may, for example, be located at the position of Fresnel lens 92 (note FIG. 5a). The unique effect of the present invention causes the image, in addition to moving across the screen, to move to the front of the screen along a dotted line path designated by numeral 77. Thus, when the arrow provided on cylindrical shell moves from the position 72' to the position 72'', its image 74b will appear in the middle of the viewing aperture and will further appear to be positioned much further to the left of aperture lens 92 than, for example, the images 74 and 74a, thereby creating an unusual and rather psychedelic effect not heretofore possible through conventional imaging systems.

FIG. 6 is a perspective view showing still another preferred embodiment of the present invention in which the apparatus 80 shown therein comprises a light source including a pair of fluorescent tubes 81a and 81b. Positioned above the light sources are a diffuser panel 82 (which may, for example, be a translucent sheet); a transparency assembly 83; a four-element lens 84; a diagonally aligned mirror 85; and an aperture lens 86.

The transparency cartridge in the embodiment shown is comprised of four individual transparencies 83a–83d arranged with a suitable frame 83e. The four-element lens assembly is comprised of four individual lenses 84a–84d arranged in spaced parallel fashion to the transparency cartridge 83 and aligned whereby each of the lens elements is associated with one of the transparencies. Reflective surface of mirror 85 is positioned so as to deflect direct rays D so that the reflected rays R pass through the aperture lens 86. The lenses 84a–84d and the aperture lens 86 may, forexample, for example, be Fresnel lenses of the type described hereinabove. Depending upon the position of an observer O, only one of the four images will be visible and, movement of the observer in either of the two directions shown by arrows 88 and 89 cause the images to be abruptly changed. One unique feature of the arrangement shown in FIG. 6 is such that the image viewed will fill the entire aperture of lens 86. Depending upon the relative positioning distance of the transparencies to the first four-element lens structure and the distance between the four-element lens structure 84 and the aperture lens 86 (measured along the lines D and R) will control the relative positioning of the image viewed by the observer so that the image can be thereby adjusted to appear either in front (i.e., to the right) of aperture lens 86 or behind (i.e., to the left of) aperture lens 86 to create either of the two desirable effects.

FIG. 7 shows a slightly modified arrangement from that of FIG. 6 which is referred to as a "double-folded" arrangement wherein a pair of diagonally aligned mirrors are employed. Like elements as between FIGS. 6 and 7 have been designated by like numerals, the major distinction being the double-folded effect created as a result of the use of the additional mirror 90 whereby light rays passing through four-element lens structure 84 (direct ray D) are reflected upwardly (reflected ray R) and are then reflected horizontally and to the right (second reflected ray R') so as to pass through aperture lens 86. The advantage of the arrangement of FIG. 7 is that the distance between four-element lens structure 84 and aperture lens 86 (measured along the lines D, R and R') can be substantially greater, while at the same time the structure can be packaged within a more confined space than the structure of FIG. 6, for example. The optical effects, however, remain substantially the same as those described in connection with FIG. 6.

The embodiments of the invention in which an exclusive privilege or property is claimed are defined as follows:

1. For use in an optical communication system providing directly viewed images of an object, a composite lens comprising:
   a first lens section; and
   a second lens section concentric with said first section and completely surrounding said first section;
   said second lens section including a Fresnel type lens having a discontinuously sloping surface forming a plurality of circular grooves of increasing diameter for projecting an illuminated image for viewing in space without the use of a screen, said Fresnel type lens having a predetermined focal length and thickness;
   said first lens section including a lens of focal length and thickness comparable to that of said Fresnel type lens but of continuously sloping smooth surface to reduce image distortion in the vicinity of the optical axis of said Fresnel type lens, the remaining surfaces of said first and second lens sections being flat and coplanar; the diameter of said first lens section being substantially greater than twice the distance between adjacent grooves of said second lens section;
   said composite lens being positioned between the object to be viewed and an observer to create an image in space which image is located between the viewer and the lens and viewable without the need for display of the image upon a viewing surface.

2. The composite lens of claim 1 in which said Fresnel type lens comprises a built-up annular arrangement of stepped rings or concentric circular areas which are oriented toward the observer for viewing an image in space.

3. The composite lens of claim 1 in which said discontinuously sloping Fresnel type lens is of substantially greater surface area than said continuously sloping lens with which it is coaxial and which it surrounds.

4. The composite lens of claim 3 in which said discontinuously sloping Fresnel type lens and said continuously sloping lens are formed from a single body of transparent material.

5. The composite lens of claim 3, in which said discontinuously sloping Fresnel type lens includes a cutout portion in the vicinity of its optical axis and in which said continuously sloping lens is matingly secured as an insert to said Fresnel type lens at said cutout portion.

6. The composite lens of claim 3 in which said continuously sloping lens is of plano-convex construction.

7. The composite lens of claim 3 in which said continuously sloping lens is of plano-concave construction.

8. The composite lens of claim 3 in which said continuously sloping lens is of spherical construction.

9. The composite lens of claim 3 in which said continuously sloping lens is of aspheric construction.

10. An optical system for creating visually observable images suspended in space comprising
    a Fresnel lens of the type described in claim 1;
    an object to be projected positioned a spaced distance from said lens whereby the image of the object created by said lens is viewable at a location on the opposite side of said lens;
    the distance of said object from said lens being such as to create an image positioned a second spaced distance from said lens and at a position between said lens and an observer.

11. The system of claim 10 wherein said object is a photographic transparency;
    a light source positioned to emit light rays which pass through said transparency and impinge upon said lens whereby said lens refracts the light rays passing through said lens to create an image of the object.

12. The system of claim 11 further comprising a translucent panel positioned between said light source and said transparency for diffusing the light rays passing therethrough toward said transparency.

13. An optical system for creating visually observable images suspended in space comprising
   a Fresnel lens of the type described in claim 1;
   an object to be projected positioned a spaced distance from said lens whereby the image of the object created by said lens is viewable at a location on the opposite side of said lens;
   the distance of said object from said lens being such as to create an image positioned a second spaced distance from said lens and at a position between said lens and said object.

14. An optical system for creating a plurality of images selectively viewable at predetermined locations relative to said system comprising
   a plurality of lenses arranged in coplanar side by side fashion, each of said lenses being of the type set forth in claim 1;
   a plurality of photographic transparencies arranged in coplanar side-by-side fashion and being arranged in spaced parallel fashion relative to said plurality of lenses whereby each lens is associated with a predetermined one of said transparencies;
   a light source arranged to direct light rays toward said transparencies;
   an aperture lens of the type described in claim 1 being positioned a spaced distance from said plurality of lenses and cooperating with said plurality of lenses to create an image of each transparency, which images are suspended in space and substantially fill the aperture, each of said images being viewable by an observer from the side of said aperture lens opposite said transparencies whereby said images are viewable at different angular positions relative to the optical axis of said aperture lens.

15. An optical system for creating a rotatably moving image comprising
   a cylindrical shell having information to be displayed arranged around its periphery;
   means for rotatably mounting said shell about its longitudinal axis;
   a light source positioned within said shell for emitting light rays passing through said shell;
   means for rotating said shell about its longitudinal axis;
   a lens of the type set forth in claim 1 being positioned exterior of said shell and adapted to create an image of said information which image is suspended in space and positioned a spaced distance from the plane of said lens, said image transversing the aperture of said lens as said shell is rotated; whereby the distance of said image from the plane of said lens changes as the distance of the information on said shell from the plane of said lens changes.

16. An optical system for creating images suspended in space and selectively viewable at differing positions comprising:
   a first housing portion comprising a first hollow enclosure;
   a second housing portion comprising a second hollow enclosure telescopingly received by one end of said first enclosure;
   a lens of the type set forth in claim 1 being positioned in the opposite end of said first enclosure;
   a pair of light sources positioned near the said opposite end of said first enclosure;
   a transparency positioned between an associated one of said light sources and the first end of said first enclosure;
   means surrounding each light source and its associated transparency for guiding light rays toward opposite diagonal corners of said second enclosure;
   first and second reflective members being positioned adjacent the aforesaid diagonal corners of said second enclosure for reflecting light rays directed from their associated transparencies toward said lens whereby said lens creates images in space viewable without need for a viewing surface and located at different regions in space.

* * * * *